(12) United States Patent
Osteen et al.

(10) Patent No.: US 11,287,068 B2
(45) Date of Patent: Mar. 29, 2022

(54) PIPE CONNECTOR WITH TAPERED THREAD NUT

(71) Applicant: Reliance Worldwide Corporation, Atlanta, GA (US)

(72) Inventors: William Clinton Osteen, Hartselle, AL (US); Davide Succurro, Vaughan (CA)

(73) Assignee: Reliance Worldwide Corporation, Atlanta, GA (US)

( * ) Notice: Subject to any disclaimer, the term of this patent is extended or adjusted under 35 U.S.C. 154(b) by 211 days.

(21) Appl. No.: 16/607,298

(22) PCT Filed: Apr. 23, 2018

(86) PCT No.: PCT/US2018/028852
§ 371 (c)(1),
(2) Date: Oct. 22, 2019

(87) PCT Pub. No.: WO2018/200375
PCT Pub. Date: Nov. 1, 2018

(65) Prior Publication Data
US 2020/0378536 A1    Dec. 3, 2020

Related U.S. Application Data

(60) Provisional application No. 62/489,165, filed on Apr. 24, 2017.

(51) Int. Cl.
*F16L 33/207* (2006.01)
*F24D 19/00* (2006.01)

(52) U.S. Cl.
CPC .......... *F16L 33/2071* (2013.01); *F24D 19/00* (2013.01); *F24D 2220/0285* (2013.01)

(58) Field of Classification Search
CPC ..... F16L 33/20; F16L 33/207; F16L 33/2071; F16L 33/223; F16L 33/224; F16L 33/00; F16L 33/2073; F16L 33/2076
USPC ..................... 285/382.7, 242, 245, 246, 247
See application file for complete search history.

(56) References Cited

U.S. PATENT DOCUMENTS

| 1,181,280 A | 5/1916 | Winter |
| 1,370,289 A | 3/1921 | Crippen |
| 1,808,094 A * | 6/1931 | Yackey ................. F16L 33/221 285/55 |

(Continued)

FOREIGN PATENT DOCUMENTS

| DE | 202 05 245 U1 | 8/2002 |
| EP | 0 750 154 A1 | 12/1996 |

(Continued)

OTHER PUBLICATIONS

CA Office Action other than Search Report on CA Appl. Ser. No. 3052495 dated Sep. 23, 2020 (8 pages).

(Continued)

*Primary Examiner* — Aaron M Dunwoody
(74) *Attorney, Agent, or Firm* — Merchant & Gould P.C.

(57) ABSTRACT

A flexible heater connector can include a hose, a nut having a female tapered thread, and a fitting structure. The female tapered thread of the nut can engage a male tapered thread associated with the heater. The fitting structure can include a first portion to mechanically engage an inner wall of the hose, and a second portion mechanically coupled to the nut. The nut can be a swivel nut.

17 Claims, 9 Drawing Sheets

(56) References Cited

U.S. PATENT DOCUMENTS

| | | | |
|---|---|---|---|
| 1,890,290 | A | 12/1932 | George |
| 2,211,446 | A | 8/1940 | Troshkin |
| 3,250,552 | A | 5/1966 | Chaloux |
| 3,346,274 | A | 10/1967 | Baron |
| 4,804,212 | A | 2/1989 | Vyse |
| 4,805,942 | A | 2/1989 | Goodridge |
| 5,221,113 | A * | 6/1993 | Stoll ..................... F16B 33/02 285/333 |
| 6,447,017 | B1 | 9/2002 | Gilbreath et al. |
| 7,014,215 | B2 * | 3/2006 | Cooper ................ F16L 37/088 285/247 |
| 7,063,357 | B1 * | 6/2006 | Bay ..................... F16L 13/147 285/246 |
| 8,733,801 | B2 | 5/2014 | Larsson et al. |
| 2010/0140926 | A1 | 7/2010 | Swift et al. |
| 2012/0007356 | A1 | 1/2012 | Menor |
| 2014/0338178 | A1 * | 11/2014 | Lehmann ................ F16L 33/20 29/450 |
| 2016/0223112 | A1 * | 8/2016 | Wildfang ................ E03C 1/025 |

FOREIGN PATENT DOCUMENTS

| | | |
|---|---|---|
| EP | 2 213 923 A1 | 8/2010 |
| GB | 0 661 271 A | 11/1951 |
| JP | H04-331887 A | 11/1992 |
| JP | 2518399 Y2 | 11/1996 |
| JP | 2002-130563 A | 5/2002 |
| JP | 2003-113980 A | 4/2003 |

OTHER PUBLICATIONS

Parkerstore Catalogue Brass Composite and Thermoplastic Fittings and Valves-Cat 3501-E, pp. 1-12 (whole catalogue).

International Preliminary Report on Patentability for Appl. Ser. No. PCT/US2018/028852 dated Nov. 7, 2019 (9 pages).

Written Opinion of the International Searching Authority re PCT/US2018/28852 dated Sep. 24, 2018.

International Search Report re PCT/US2018/28852 dated Sep. 24, 2018.

EP Supplementary Search Report on EP Appl. Ser. No. 18791527.7 dated Feb. 5, 2021 (7 pages).

* cited by examiner

PIPE CONNECTOR WITH TAPERED THREAD NUT

CROSS-REFERENCE TO RELATED APPLICATIONS

This application is a national stage application under 35 U.S.C. § 371 of International Patent Application No. PCT/US2018/028852, entitled "PIPE CONNECTOR WITH TAPERED THREAD NUT," filed Apr. 23, 2018, which claims the benefit of and priority to U.S. Provisional Application No. 62/489,165, entitled "PIPE CONNECTOR WITH TAPERED THREAD NUT" and filed Apr. 24, 2017, each of which is incorporated herein by reference in its entirety.

BACKGROUND

Commercial and residential water heaters can be connected to hot and cold water supply lines via flexible water heater connectors. A flexible water heater connector can include a flexible hose with two female threaded ends. A first female threaded end of the flexible hose can be tightened onto a pipe nipple or a "trap nipple" of the water heater tank. The second female threaded end of the flexible hose can be tightened onto a pipe (e.g., a pipe acting as the cold or hot water supply line) with male threading at the end of the pipe. Flexible water heater connectors utilize a national pipe straight mechanical (NPSM) thread type with an elastomer gasket for sealing. NPSM threads are straight threads.

Flexible water heater connectors can come in different sizes (e.g., different length) and/or can be manufactured from different materials. The hose flexibility facilitates installation of the flexible connectors since the corresponding hoses are capable of bending without breaking. Also, the threading at both ends allows the flexible connector to resist water pressure and stay tightened to the pipe and the water heater nipple.

SUMMARY

According to at least one aspect, a flexible heater connector can include a hose, a nut having a female tapered thread, and a fitting structure. The female tapered thread of the nut can engage a male tapered thread associated with the heater. The fitting structure can include a first portion to mechanically engage an inner wall of the hose, and a second portion mechanically coupled to the nut.

The nut can include a swivel nut capable of rotating around a longitudinal axis of the nut. The flexible heater connector can include a hose crimp for tightening the hose onto (or pressing the hose against) the fitting structure when crimped. The fitting structure can include one or more protrusions arranged at an outer surface of the first portion of the fitting structure to mechanically engage the inner wall of the hose. The fitting structure can include an o-ring arranged between a first portion of the nut and the second portion of the fitting structure. The second portion of the fitting structure can include a recess to receive the o-ring.

The flexible heater connector can include a circlip arranged adjacent to an end of a contact region between the second portion of the fitting structure and a portion of the nut. The nut can include a recess to receive the circlip. The flexible heater connector can include a gasket arranged around the first portion of the fitting structure to form a mechanical separation between an end of the nut and an end of the hose facing the end of the nut. The second portion of the fitting structure can be adjacent to an inner wall of a tubular structure including the male tapered thread associated with the heater when the tapered female thread of the nut engages the male tapered thread associated with the heater. The flexible heater connector can include a gasket arranged adjacent to an end of a contact region between the second portion of the fitting structure and a portion of the nut. The nut can include a recess to receive the gasket. The gasket can include a dielectric gasket.

According to at least one other aspect, a flexible heater connector can include a hose and a fitting component to couple the hose to a heater nipple or pipe. The fitting component can include a first portion and a second portion. The first portion can act as a fitting structure to mechanically engage an inner wall of the hose. The second portion can act as a non-swivel having a female tapered thread to mechanically engage a male tapered thread of the heater nipple or pipe.

The flexible heater connector can include a hose crimp for tightening the hose onto (or pressing the hose against) the fitting structure when crimped. The first portion of the fitting component can include one or more protrusions arranged at an outer surface of the first portion of the fitting component to mechanically engage the inner wall of the hose. The flexible heater connector can include a gasket arranged around the first portion to form a mechanical separation between an end of the second portion and an end of the hose facing the second portion of the fitting. The flexible heater connector can include a gasket arranged within the second portion of the fitting.

According to at least one other aspect, a flexible heater connector can include a hose and a fitting component to couple the hose to a nut associated with a heater. The fitting component can include a first portion and a second portion. The first portion can act as a fitting structure to mechanically engage an inner wall of the hose. The second portion can have a male tapered thread to engage a female tapered thread of the nut associated with the heater.

The flexible heater connector can include a hose crimp for tightening the hose onto (or pressing the hose against) the first portion of the fitting component when crimped. The first portion of the fitting component can include one or more protrusions arranged at an outer surface of the first portion of the fitting to mechanically engage the inner wall of the hose.

BRIEF DESCRIPTION OF THE DRAWINGS

Embodiments of the inventive concepts disclosed herein will become more fully understood from the following detailed description, taken in conjunction with the accompanying drawings, wherein like reference numerals refer to like elements, in which.

Figure 1:
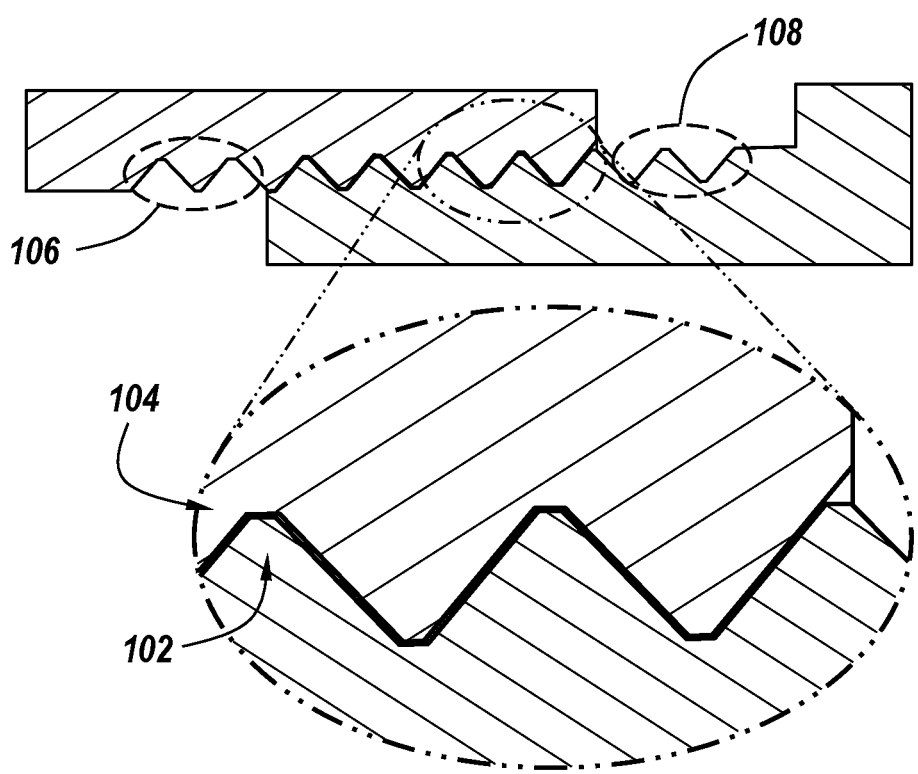
FIG. 1 is a cross-sectional diagram illustrating wedded male and female tapered threads.

The details of various embodiments of the methods and systems are set forth in the accompanying drawings and the description below.

DETAILED DESCRIPTION

Embodiments of the inventive subject matter of the current disclosure relate to plumbing of residential and commercial water heaters. In particular, the subject matter of the current disclosure relates to embodiments of a flexible water heater connector that utilizes a tapered thread for connection to a water heater pipe nipple or for connection to a pipe. The flexible water heater connector configurations (or designs) described herein are provided for illustrative purposes and are not to be interpreted as restricted or limited to a specific connection size, a specific connector length, or a specific material.

Even though the male thread on pipes or water pipe nipples can be a tapered thread, such as the national pipe taper (NPT) thread, flexible water heater connectors utilize a straight thread, such as the national pipe straight mechanical (NPSM) thread type, with an elastomer gasket for sealing. A straight thread runs parallel to a longitudinal axis of a structure (e.g., a nut, connector, pipe, water heater nipple, etc.) including the straight thread, while a tapered thread has a taper and runs along a line that is at a small angle (e.g., 1 to 4 degrees) with respect to a longitudinal axis of the structure including the tapered thread. The taper causes male and female tapered threads, when mated, to compress and form a seal. When mated, male and female straight threads (e.g., NPSM thread), however, do not have sealing capabilities similar to tapered threads. Accordingly, a thread sealant, elastomer gasket, or other sealing material or mechanism is usually used with straight threads.

Water heaters are typically equipped with a pipe nipple or a "trap nipple" coming from the side or top of the water heater tank. The pipe nipple has a tapered male thread, such as national pipe taper (NPT) thread. The use of a straight female thread with a tapered male thread of the pipe nipple, while it has some advantages, can have serious disadvantages. Specifically, when wedding a straight female thread to a tapered male thread, the threads do not completely overlap leaving some space in between. While the straight female thread runs along a line parallel to the longitudinal axis of the flexible connector, the tapered male thread runs along a line that is at a small angle (e.g., 1 to 4 degrees) with respect to a longitudinal axis of the pipe or the water heater nipple. When both threads are wedded together, the difference in angle prevents a complete overlap between them and gaps or space between the male and female threads may lead to serious functional and structural defects.

The lack of a complete overlap between the threads leads to a reduced coupling strength between the flexible water heater connector and the pipe or the water heater pipe nipple. In some instances, the coupling between non-matching threads (e.g., when wedding a straight female thread to a tapered male thread) may not withstand increased water pressure, and the flexible water heater connector may pop off the water heater nipple (or the water pipe). When the flexible water heater connector pops off the water heater nipple, that can lead to property damages as well as serious safety risks. Flexible water heater connector manufacturers may be the subject of liability claims due to such functional defects in the coupling between the flexible water heater connector and the water heater nipple. Also, gaps or spacing between the wedded male and female threads may lead to water leaks and relatively fast corrosion of the threads. The corrosion can damage the teeth of the either or both threads, weaken the mechanical coupling between the threads, and reduce the lifetime of the flexible water heater connector or the water heater nipple.

FIG. 1 is a cross-sectional diagram of wedded male and female tapered threads illustrating the overlap between both threads. The tapered male thread 102 and the tapered female thread 104 can completely overlap, when mated together, given that both are of the same type (e.g., both are NPT threads). In such case the mechanical coupling between the threads is stronger than cases where the male and female threads are of different types. However, when tightening a tapered female thread 104 to a tapered male thread 102, the two threads can get tightened half way through due to, for example, the manufacturing (or dimensional) tolerance associated with each of the threads. For example, considering the illustration in FIG. 1, the wedding between the two threads 102 and 104 can get very tight before the two threads 102 and 104 are fully coupled to one another. As such, the female thread region 106 may not overlap, even partially, with any portion of the tapered male thread 102. The male thread region 108 may not overlap, even partially, with any region of the tapered female thread 104. As a consequence, the female thread region 106 can be exposed to water flowing through the flexible water heater connector and may suffer corrosion. Corrosion can substantially damage the structure and the strength of the tapered female thread 104. The corrosion can migrate beyond the region 106 to other regions of both the male tapered thread 102 and the female tapered thread 104 leading to structural and functional defects of both threads over time.

The water heater nipple and the water heater connector can be independently manufactured, e.g., by different manufacturers, therefore, increasing the likelihood of non-full coupling (as illustrated in FIG. 1) between the corresponding male and female tapered threads. The non-full (or partial) coupling between the male and female threads due to dimensional tolerance (or dimensional errors associated with the manufacturing process) represents a technical difficulty associated with using tapered female threads in water heater connectors (or flexible water heater connectors).

Figure 2:
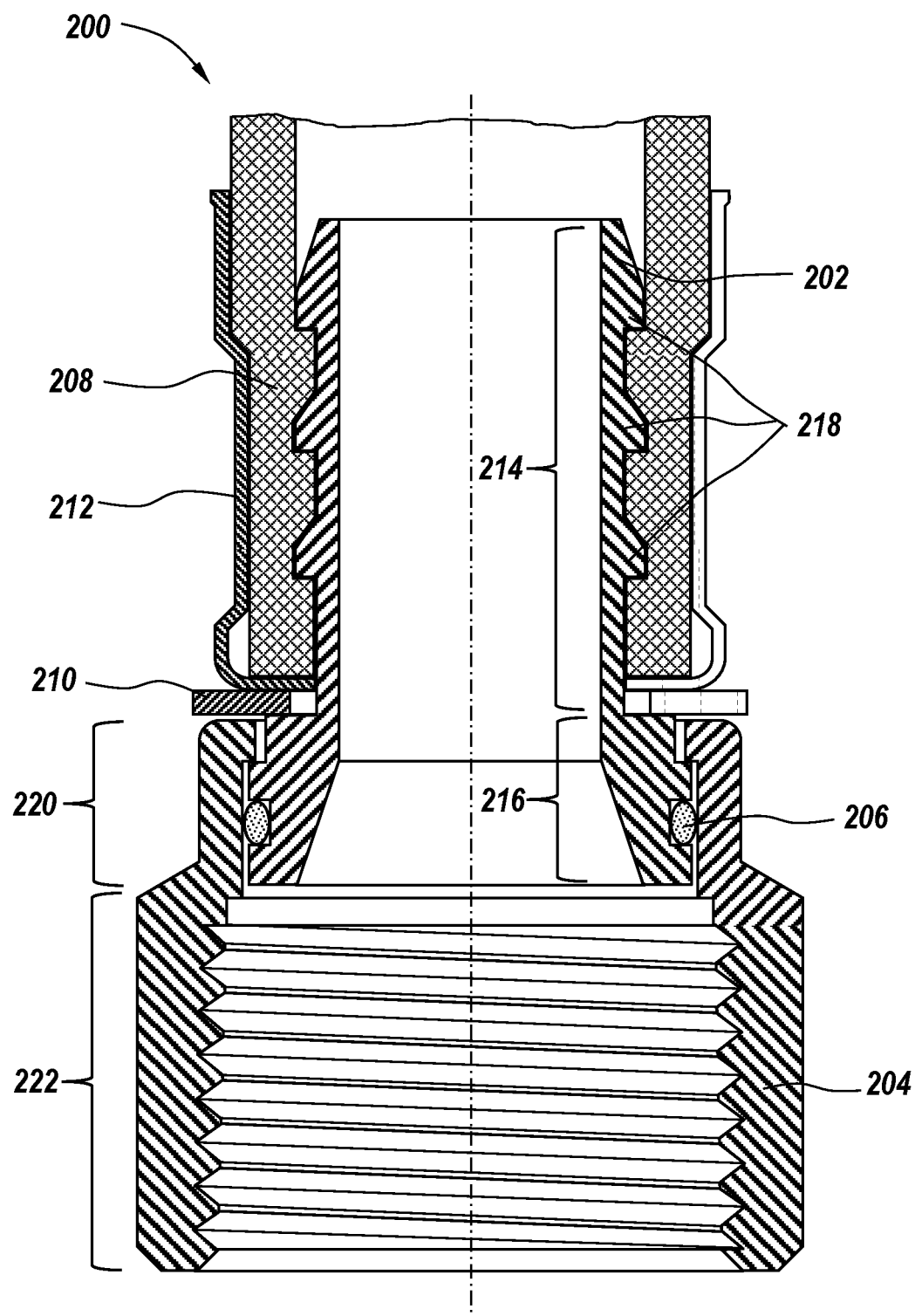
FIG. 2 is a cross-sectional diagram illustrating a first configuration of a flexible water heater connector having a swivel nut with a female tapered thread, according to example embodiments of the current disclosure.

FIG. 2 is a cross-sectional diagram illustrating a first configuration of a flexible water heater connector 200 having a swivel nut with a female tapered thread, according to example embodiments of the current disclosure. The flexible connector 200 can include a fitting structure 202 and a swivel nut 204 having a tapered female thread. The swivel nut 204 can engage (or can be mechanically coupled to) the fitting structure 202. The flexible connector 200 can include an o-ring 206 arranged between the fitting structure 202 and the swivel nut 204. The flexible connector 200 can include (or can be mechanically coupled to) a hose 208. The flexible connector 200 can include a dielectric gasket 210 arranged around the fitting structure 202 and adjacent to one end of the swivel nut 204. The flexible connector 200 may also include a hose crimp 212 for tightening the hose 208 onto the fitting structure 202.

The fitting structure 202 can include a first portion 214 to engage, or to be pushed in, the hose 208 and a second portion 216 to engage (or mechanically couple to) the swivel nut 204. The first portion 214 can include projections 218 (also referred to herein as toothed structures, protrusions or convex structures) arranged on the outer surface of the first portion 214 of the fitting structure 202. The projections 218 can mechanically engage the inner surface of the hose 208 to keep the fitting structure 202 fixed (with respect to the hose 208) once pushed into the hose 208. The projections 218 can be pointed projections (e.g., having sharpened or tapered tips or ends) to grab onto the inner surface of the hose 208 and keep the fitting structure 202 firmly tightly fixed (or coupled) to the hose 208. The hose crimp 212 can be tightened, e.g., using a crimping tool, after pushing the fitting structure 202 into the hose 208, to achieve a tight mechanical coupling between the hose 208 and the fitting structure 202. The projections 218 of the fitting structure 202 engaging the inner wall of the hose 208, and/or the hose crimp 212 can strengthen the mechanical coupling between the hose 208 and the fitting structure 202 to prevent water leaks or potential uncoupling of the fitting structure 202 from the hose 208 due to, for example, water pressure or other hose expansion.

The second portion 216 of the fitting structure 202 can mechanically engage (or be coupled to) the swivel nut 204. Specifically, the second portion of the fitting structure 202 can engage a first end (or first portion) 220 of the swivel nut 204. The first portion 220 of the swivel nut 204 can enclose or surround the second portion 216 of the fitting structure 202, and the swivel nut 204 can rotate around a respective longitudinal axis. The second portion 216 of the fitting structure 202 can include a groove (or recess) at its outer surface to host the o-ring 206. The o-ring 206 can act as a sealing to prevent water leaks through the contact region between the fitting structure 202 and the swivel nut 204. The o-ring 206 can prevent or mitigate mechanical friction between areas or regions of contact between the second portion 216 of the fitting structure 202 and the first portion 220 of the swivel nut 204, especially as the swivel nut 204 rotates around the first portion 214 of the fitting structure 202. As such, the o-ring 206 can prevent or mitigate structural damage or structural wear of these areas or regions of contact. The swivel nut 204 can include a second end (or second portion) 222 that includes a tapered female thread to engage a tapered male thread of a pipe or water heater nipple (not Shown in FIG. 2).

The flexible connector 200 can include a dielectric (or other type of) gasket 210 arranged, for example, at the end of the first and second portions 214 and 216 of the fitting structure 202. The dielectric gasket 210 can act as a mechanical shield (or mechanical separation) between the first end of the swivel nut and an end of the hose 208 engaging the fitting structure 202. Specifically, the dielectric gasket 210 can prevent direct contact between hose crimp 212 or the end of the hose 208 engaging the fitting structure 202 and the swivel nut 204 (or the first end thereof). The dielectric gasket 210 can help avoid a scenario, for example, where the fitting structure 202 is pushed too deep into the hose 208 causing the end of hose 208 engaging the fitting structure 202 (and facing the swivel nut 204) to exert contact pressure or force on the swivel nut 204 preventing the swivel nut 204 from rotating freely around the fitting structure 202.

Using a swivel nut 204 (instead of a fixed nut) can significantly facilitate the installation process of the flexible connector 200 onto the heater nipple or onto the water pipe or the uncoupling of the flexible connector 200 from the heater nipple or the water pipe. For instance, a user can tighten the flexible connector 200 to a water pipe or a water heater nipple by rotating the nut 204 without causing the hose 208 to twist or rotate. A non-swivel nut would otherwise result in the whole hose 208 swiveling when tightening the flexible connector to the water pipe or the water heater nipple. Examples of water heater connectors with non-swivel nut are discussed below with regard to FIGS. 7A and 7B. When the swivel nut is 204 firmly tightened to the water pipe or the water heater nipple, the female tapered thread of the swivel nut 204 and the male tapered thread of the water pipe or the water heater nipple can compress and form a seal preventing water leak between the two threads. Specifically, given the taper associated with both the male and female threads, the further the male tapered thread of the water pipe or the water heater nipple engages the female tapered thread of the swivel nut, the tighter and the firmer the contact between both threads gets, therefore, eliminating any spacing or gaps between both threads. Also, the tight or firm engagement between the male tapered thread of the water pipe or the water heater nipple and the female tapered thread of the swivel nut allows for relatively strong coupling (e.g., compared to coupling between straight male and straight female threads) between both threads.

Figure 3:
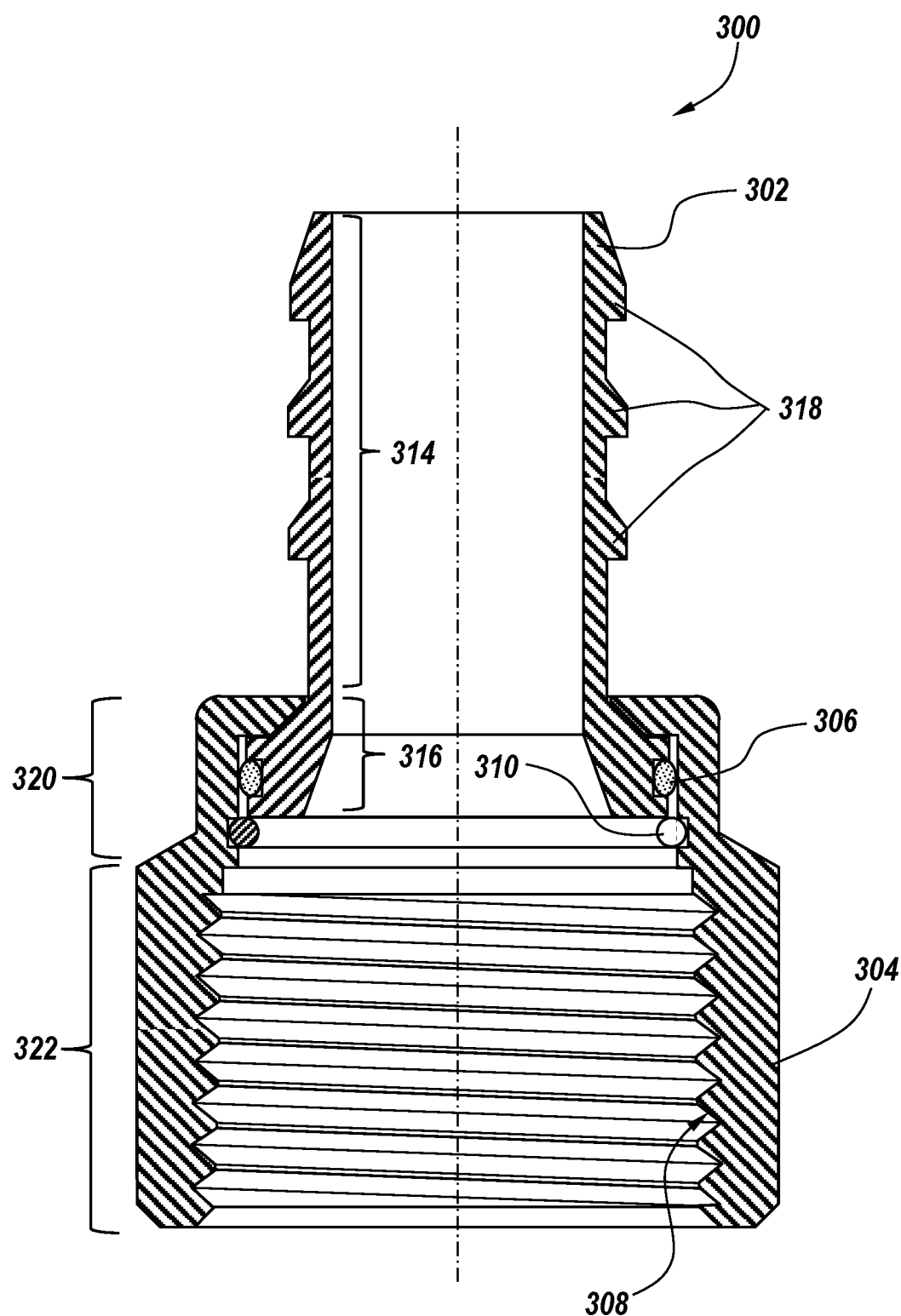
FIG. 3 is a diagram illustrating a second configuration of a flexible water heater connector including a swivel nut with a female tapered thread, according to example embodiments of the current disclosure.

FIG. 3 is a diagram illustrating a second configuration of a flexible water heater connector 300 including a swivel nut 304 with a female tapered thread 308, according to example embodiments of the current disclosure. The flexible water heater connector 300 can include a fitting structure 302 and a nut 304 that are functionally and/or structurally similar to the fitting structure 202 and the swivel nut 304 described with regard to FIG. 2. For instance, the fitting structure 302 can include a first portion 314 to engage a hose of the flexible water heater connector 300, and a second portion 316 to engage the swivel nut 304 (or a portion thereof. The nut 304 can include a first portion 320 to engage the second portion 316 of the fitting structure 302, and a second portion 322 that includes a female tapered thread 308 to engage a male tapered thread of a pipe or a water heater nipple. The second portion 316 of the fitting structure 302 can include a groove (or recess) to host an o-ring 306 that may be similar to the o-ring 206 of FIG. 2. The nut 304 can be a swivel nut (e.g., similar to nut 204 of FIG. 2). The nut 304 can include a groove (or recess) to host a circlip 310 adjacent to the end of the contact area (or contact region) between the first portion 320 of the nut 304 and the second portion 316 of the fitting structure 302. The circlip 310 can be a piece of metal (round, square or rectangular cross section). The circlip 310 can engage an end of the fitting structure 302, and therefore, prevent the fitting structure 302 from moving along a longitudinal axis of the nut 304. The first portion 314 of the fitting structure 302 can include projections (or protrusions) 318 on its outer surface to mechanically engage the inner wall of the hose (not shown in FIG. 3) and provide increased coupling (or friction) force between the fitting structure and the hose.

Figure 4:
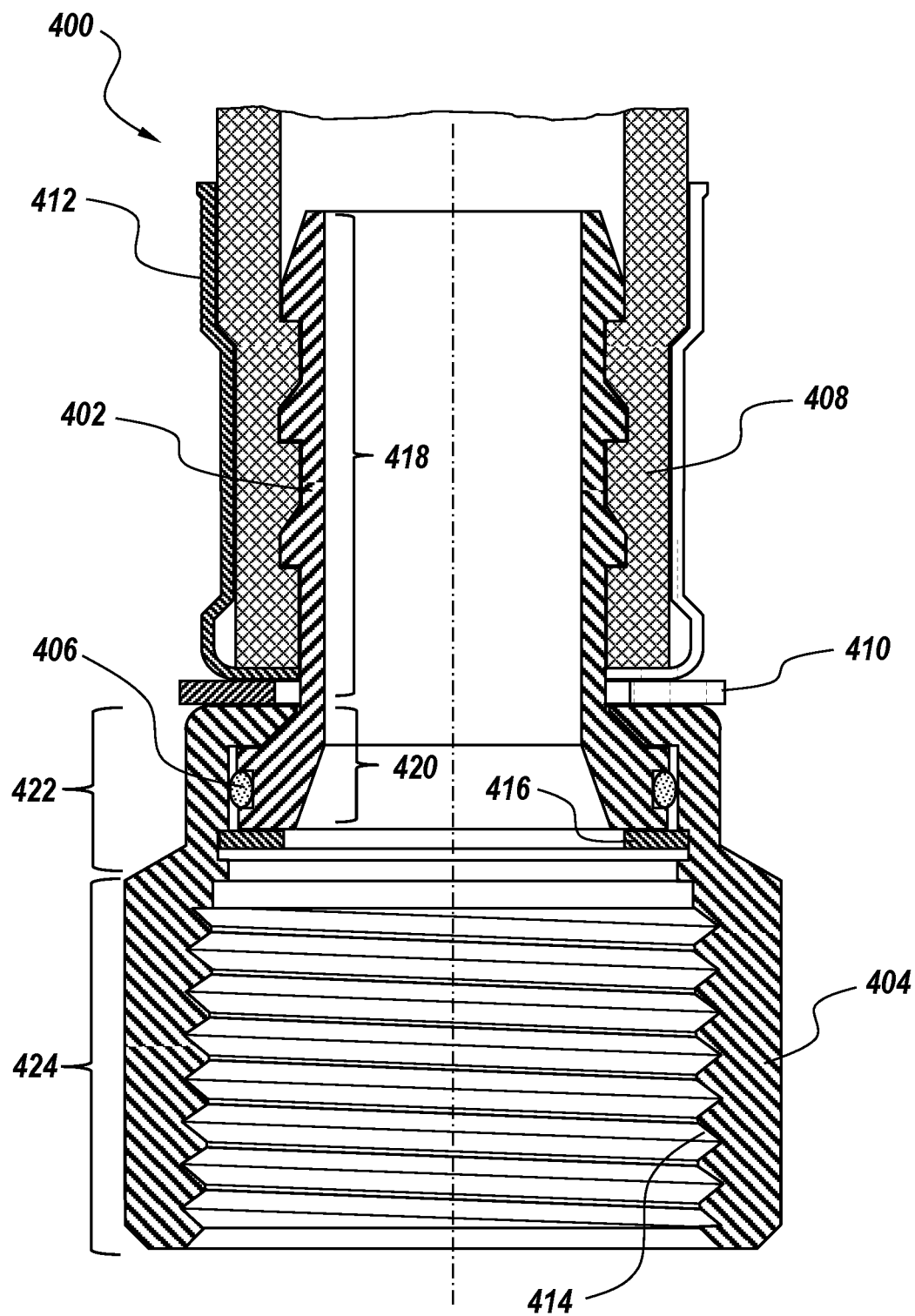
FIG. 4 is a diagram illustrating a third configuration of a flexible water heater connector including a swivel nut with a female tapered thread, according to example embodiments of the current disclosure.

FIG. 4 is a diagram illustrating a third configuration of a flexible water heater connector 400 including a swivel nut 404 with a female tapered thread, according to example embodiments of the current disclosure. The flexible water heater connector 400 can include a fitting structure 402, a swivel nut 404 and a hose 408. The fitting structure 402 can include a first portion 418 to mechanically engage (or to be pushed into) the hose 408, and a second portion 420 to engage the swivel nut 404. The swivel nut 404 can include a first portion 422 to engage the second portion 420 of the swivel nut 404, and a second portion 424 having a tapered female thread 414 to engage a male tapered thread of a pipe or a heater nipple. The flexible heater connector 400 can include an o-ring 406 between the second portion 420 of the fitting structure 402 and first portion 422 of the swivel nut 404. For instance, the second portion 420 (e.g., at a corresponding surface facing the second portion 422 of the swivel nut) of the fitting structure 402 can include a recess or groove to house the o-ring 406. The flexible heater connector 400 can include a gasket 410, and a hose crimp 412, similar to the flexible water heater connector 200 of FIG. 2. The gasket 410 can be arranged around the first portion 418 of the fitting structure 402. The gasket 410 (similar to gasket 210 in FIG. 2) can act as a mechanical shield (or mechanical separation) between an outer end of the swivel nut 404 and an end of the hose 408 engaging the fitting structure 402. The gasket 410 can include a dielectric gasket. The flexible water heater connector 400 can further include a flat gasket 416 arranged inside the swivel nut 404, for example, at the end of and transversal (or perpendicular) to the contact area between the fitting structure 402 and the swivel nut 404. The o-ring 406 can act as a sealing to prevent water leaks through the contact area between the fitting structure 402 and the swivel nut 404. The flat gasket 416 can be a piece of metal (round, square or rectangular cross section). The flat gasket 416 can keep the fitting structure 402 and the swivel nut 404 in given positions relative to one another. The gasket 416 can act as a sealing to prevent water leak between the fitting structure 402 and the swivel nut 404.

Figure 5:
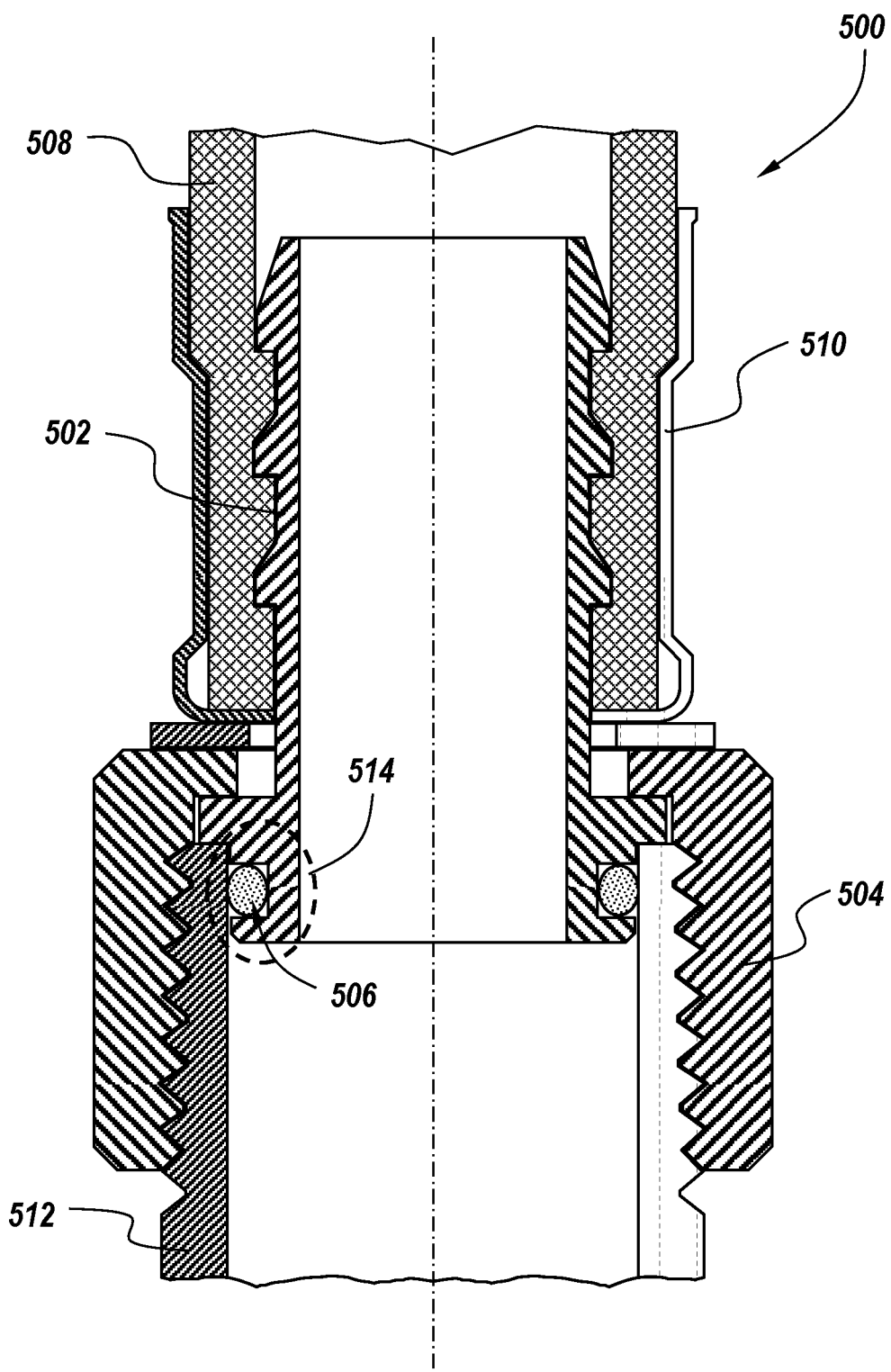
FIG. 5 is a diagram illustrating a fourth configuration of a flexible water heater connector including a swivel nut with a female tapered thread, according to example embodiments of the current disclosure.

FIG. 5 is a diagram illustrating a fourth configuration of a flexible water heater connector 500 including a swivel nut 504 with a female tapered thread, according to example embodiments of the current disclosure. Similar to the flexible water heater connector 200 of FIG. 2, the flexible water heater connector 500 can include a fitting structure 502, a swivel nut 504, a hose 508 and a hose crimp 510. However, the fitting structure 502 can be shaped in a way to have a portion 514 that extends beyond the contact area with the nut 504. Such extending portion 514 can be arranged adjacent to (or can have a contact area with an inner surface of) the pipe (or water heater nipple 512). The portion 514 can include a groove or recess to host the o-ring 506. The o-ring 506 can act as a sealing to prevent water from flowing into the contact area between the tapered female thread of the nut 504 and the male tapered thread of the pipe (or water heater nipple) 512.

Figure 6:
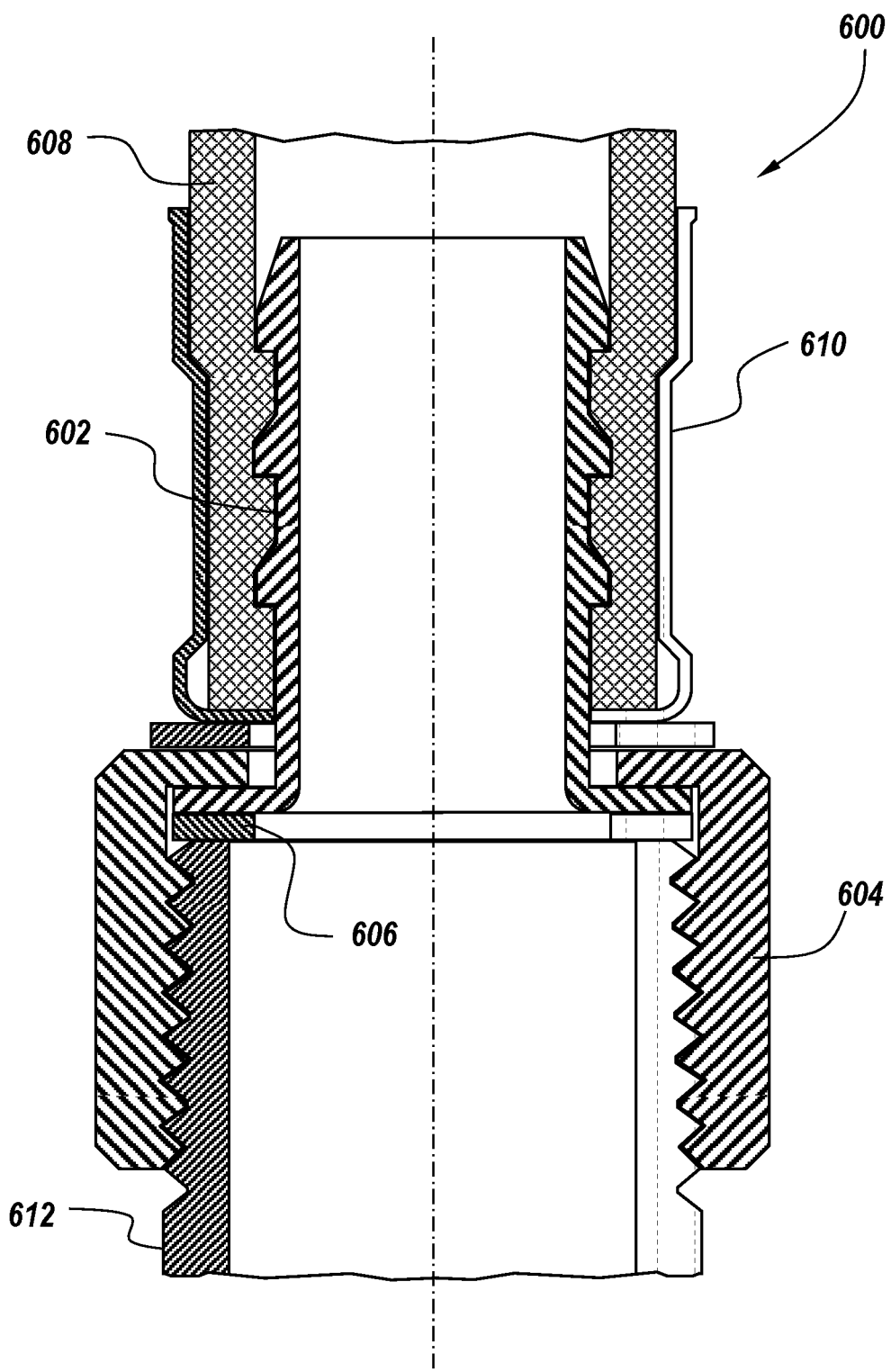
FIG. 6 is a diagram illustrating a fifth configuration of a flexible water heater connector including a swivel nut with a female tapered thread, according to example embodiments of the current disclosure.

FIG. 6 is a diagram illustrating a fifth configuration of a flexible water heater connector 600 including a swivel nut 606 with a female tapered thread, according to example embodiments of the current disclosure. The flexible water heater connector 600 can include a fitting structure 602 having a first portion to be pushed into a hose 608, a swivel nut 604, and a flat gasket 606 arranged inside the swivel nut 604. The fitting structure 602 can have a second portion to engage the nut 604. The flat gasket 606 can be positioned (inside the nut 604) between one end of the fitting structure 602 and one end of the pipe (or water heater nipple) 608. The flat gasket can act as a sealing to prevent water leaks through the contact area between the tapered female thread of the nut 604 and the male thread of the pipe (or water heater nipple) 612.

Figure 7A:
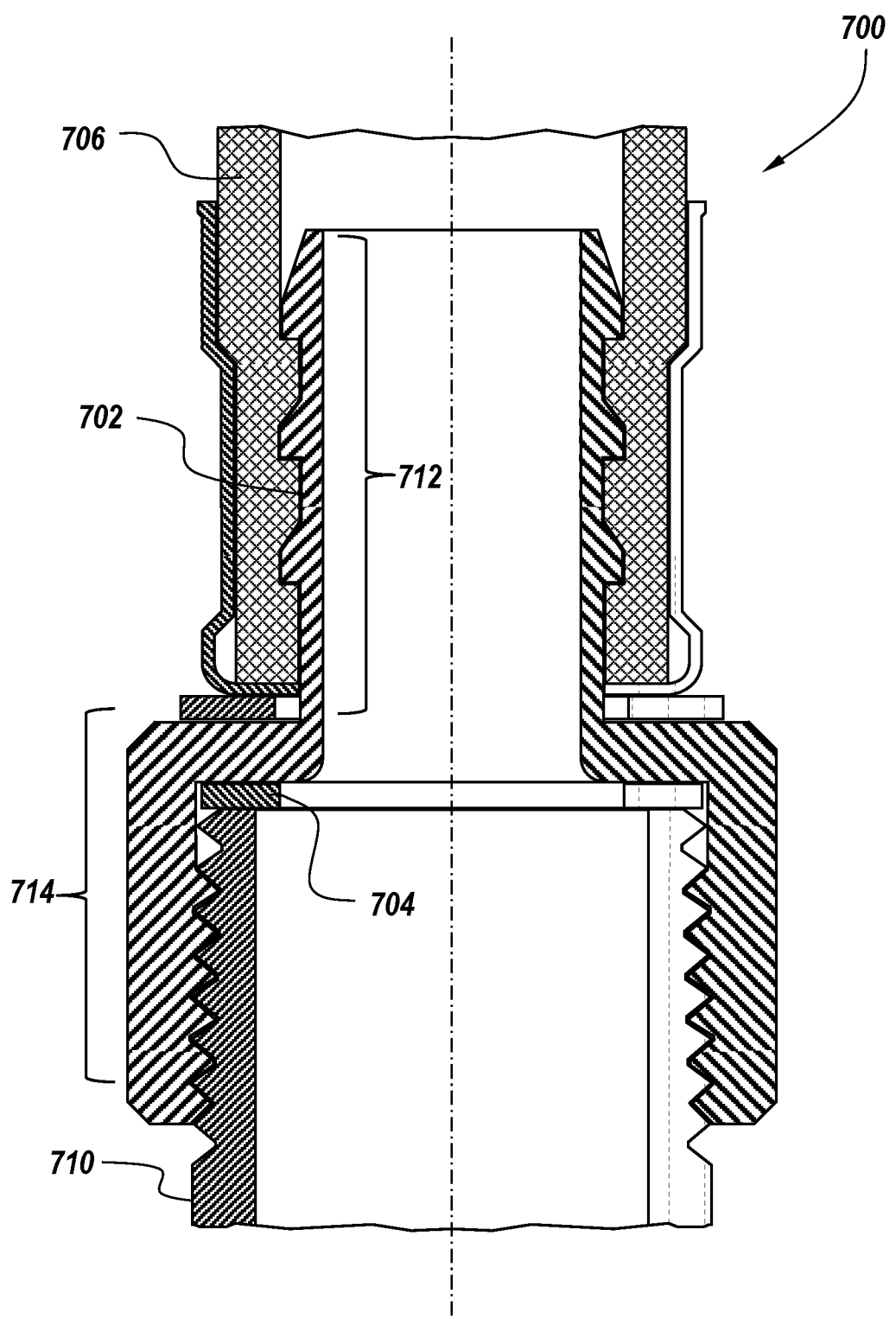
FIGS. 7A and 7B show diagrams illustrating example configurations of a flexible water heater connector including a non-swivel nut with a female tapered thread, according to example embodiments of the current disclosure.

FIG. 7A is a diagram illustrating a configuration of a flexible water heater connector 700a including a non-swivel nut 702 with a female tapered thread, according to example embodiments of the current disclosure. Unlike the water heater connectors 200, 300, 400, 500, and 600, the flexible water heater connector 700a can include a single structure 702 (also referred to herein as a fitting component 702) having a first portion 712 acting as a fitting structure to be pushed into the hose 706, and a second portion 714 acting as a non-swivel nut with a tapered female thread. The fitting component 702 can be a monolithic component or piece. The tapered female thread of the non-swivel nut portion 714 can engage a male thread of the pipe (or water heater nipple) 710. The flexible water heater connector 700a may include a flat gasket 704 arranged inside the non-swivel nut portion to act as a sealing at the end of the contact area between the tapered female thread and male thread of the pipe (or water heater nipple) 710. The flexible water heater connector 700a may include a hose crimp 708 for tightening the hose onto the fitting structure portion. According to the configuration (or design) of FIG. 7A, the hose will rotate with the non-swivel nut 702 when installing the water heater connector 700a.

Figure 7B:
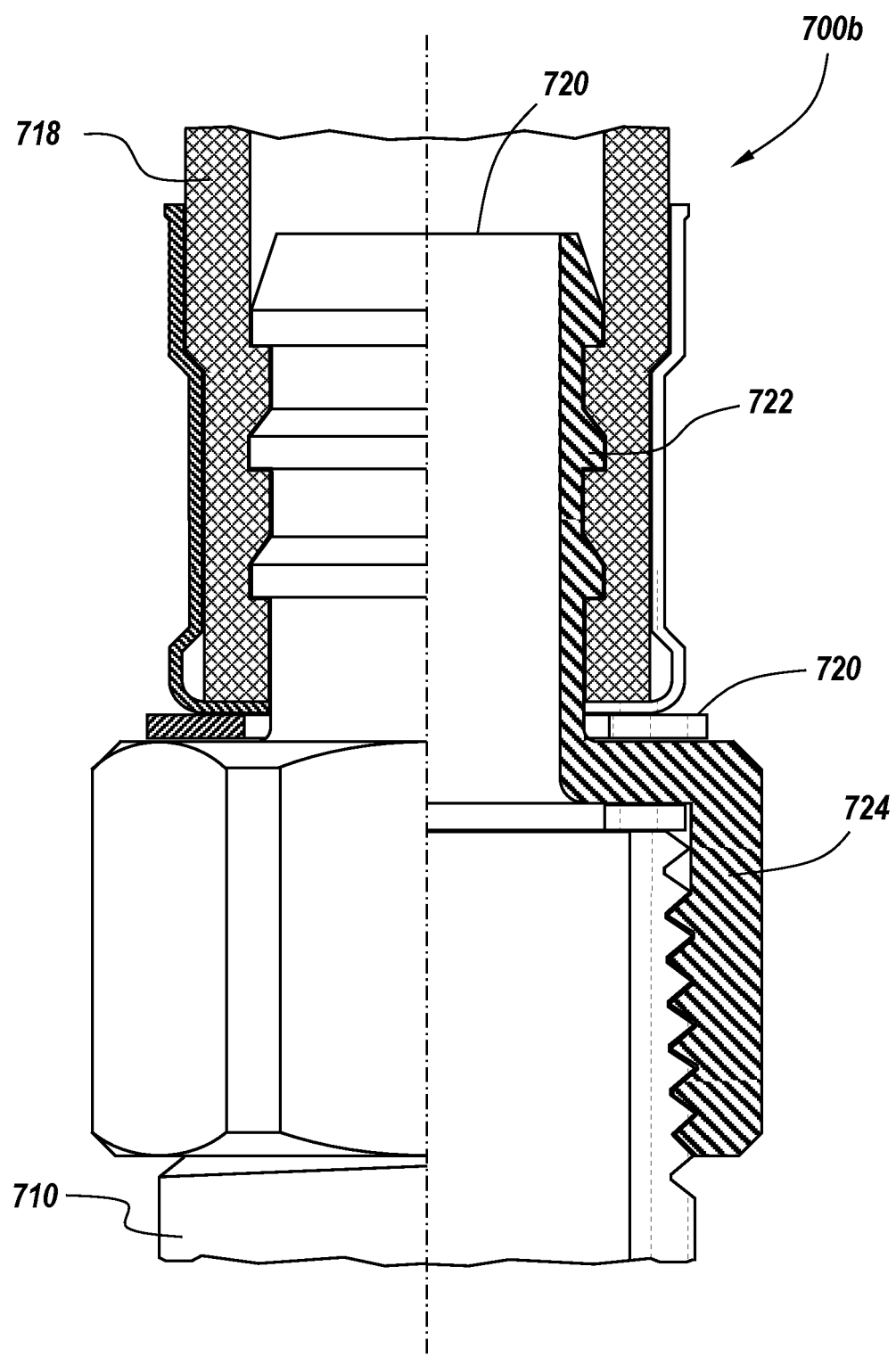

FIG. 7B is a diagram illustrating another configuration of a flexible water heater connector 700b including a non-swivel nut with a female tapered thread, according to example embodiments of the current disclosure. The flexible water heater connector 700b, similar to the flexible water heater connector 700a, can include a hose 718, a single structure 720 (also referred to herein as a fitting component 720) having a first portion 722 acting as a fitting structure to be pushed into the hose 718 and a second portion 724 acting as a non-swivel nut with a tapered female thread. The fitting component 720 can be a monolithic component or piece. The flexible water heater connector 700b may include a flat gasket (e.g., similar to the flat gasket 704 of FIG. 7A) arranged inside the non-swivel nut portion 724. The flexible water heater connector 700b may (or may not) include a dielectric gasket 720 arranged between one end of the hose 718 and an outer area (or surface) of the non-swivel nut portion 724.

Figure 8:
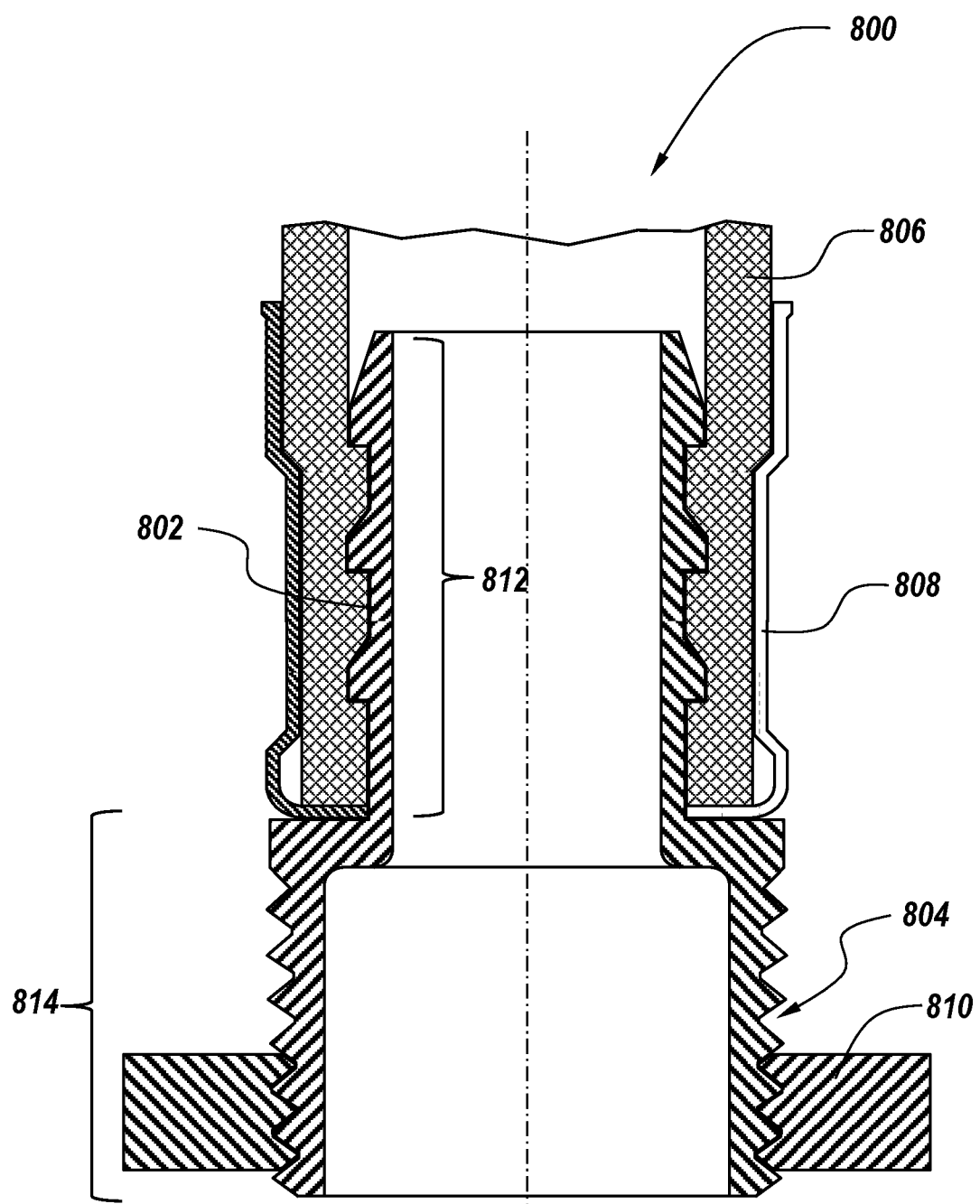
FIG. 8 is a diagram illustrating a configuration of a flexible water heater connector including a male tapered thread, according to example embodiments of the current disclosure.

FIG. 8 is a diagram illustrating a configuration of a water heater connector 800 including a male tapered thread, according to example embodiments of the current disclosure. The flexible water heater connector 800 can include a fitting component 802 that has a first portion 812 acting as a fitting structure to be pushed in the hose 806, and a second portion 814 acting as a non-swivel nut and having a tapered male thread 804 for wedding with a female tapered thread of a nut 810 associated with, for example, the water heater. The fitting component 802 can be a monolithic component or piece. According to the configuration (or design) of FIG. 8, the nut 810 may be a swivel nut at the water heater end, otherwise the hose 806 will rotate with the non-swivel structure 802 when installing the water heater connector 800. The flexible water heater connector 800 can include a hose crimp 808 to tighten the hose against the first portion 812.

When installing the water heater connectors described herein, a teflon tape may be wrapped around the male thread (e.g., male thread of the pipe or the water heater nipple) to seal the contact area between the male and female threads and prevent water leaks through such area.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

What is claimed is:

1. A flexible heater connector comprising:
   a hose;
   a nut having a female tapered thread to engage a male tapered thread associated with a heater;
   a fitting structure including a first portion to mechanically engage an inner wall of the hose, and a second portion mechanically coupled to the nut;
   a hose crimp for tightening the hose onto the fitting structure;
   an o-ring arranged between the nut and the second portion of the fitting structure; and
   a gasket arranged around the first portion of the fitting structure for mechanical separation between an end of the nut and an end of the hose facing the end of the nut to prevent direct contact between the hose crimp or the end of the hose and the nut;
   wherein the nut is a swivel nut capable of rotating around a longitudinal axis of the nut.

2. The flexible heater connector of claim 1, wherein the fitting structure includes one or more protrusions arranged at an outer surface of the first portion of the fitting structure to mechanically engage the inner wall of the hose.

3. The flexible heater connector of claim 2, wherein the hose crimp is configured to be crimped to tighten the hose onto the one or more protrusions.

4. The flexible heater connector of claim 1, wherein the second portion of the fitting structure includes a recess to receive the o-ring.

5. The flexible heater connector of claim 1, further comprising a circlip arranged adjacent to an end of a contact region between the second portion of the fitting structure and a portion of the nut.

6. The flexible heater connector of claim 5, wherein the nut includes a recess to receive the circlip.

7. The flexible heater connector of claim 5, wherein the circlip is positioned beyond an end of the fitting structure along the longitudinal axis of the nut.

8. The flexible heater connector of claim 5, wherein the circlip is configured to engage an end of the fitting structure to prevent the fitting structure from moving along the longitudinal axis of the nut in only one direction.

9. The flexible heater connector of claim 1, wherein the second portion of the fitting structure is arranged to be adjacent to an inner wall of a tubular structure including the male tapered thread associated with the heater when the female tapered thread of the nut engages the male tapered thread associated with the heater.

10. The flexible heater connector of claim 1, further comprising an additional gasket arranged adjacent to an end of a contact region between the second portion of the fitting structure and a portion of the nut.

11. The flexible heater connector of claim 10, wherein the nut includes a recess to receive the additional gasket.

12. The flexible heater connector of claim 10, wherein the additional gasket is a dielectric gasket.

13. The flexible heater connector of claim 1, wherein the hose crimp comprises a bent portion configured to form a mechanical separation between the gasket and an end of the hose facing the gasket.

14. A heater connector comprising:
   a hose;
   a fitting component to couple the hose to a heater nipple or pipe, the fitting component including:
      a first portion acting as a fitting structure to mechanically engage an inner wall of the hose; and
      a second portion acting as a non-swivel and having a female tapered thread to mechanically engage a male tapered thread of the heater nipple or pipe;
   a hose crimp configured to be crimped onto the hose to tighten the hose onto the fitting structure; and
   a gasket arranged around the first portion of the fitting component for mechanical separation between an end of the nut and an end of the hose facing the end of the nut to prevent direct contact between the hose crimp or the end of the hose and the nut.

15. The heater connector of claim 14, wherein the fitting structure includes one or more protrusions arranged at an outer surface of the first portion of the fitting component to mechanically engage the inner wall of the hose.

16. The heater connector of claim 14, further comprising an additional gasket arranged within the second portion of the fitting component.

17. A flexible connector for a water heater, comprising:
   a hose;
   a swivel nut including a female tapered thread configured to engage a male tapered thread of the water heater;
   a fitting structure including a first portion configured to engage an inner wall of the hose, and a second portion configured to engage to the swivel nut;
   a hose crimp configured to couple the hose to the fitting structure; and
   a gasket arranged around the first portion of the fitting structure for mechanical separation between an end of the swivel nut and an end of the hose facing the end of the nut to prevent contact between the hose crimp and the swivel nut or the end of the hose and the swivel nut.

* * * * *